US008767225B2

(12) United States Patent
Sasakuma

(10) Patent No.: US 8,767,225 B2
(45) Date of Patent: Jul. 1, 2014

(54) IMAGE FORMING APPARATUS, INFORMATION DEVICE, AND COMPUTER-READABLE STORAGE MEDIUM FOR COMPUTER PROGRAM FOR SETTING A FUNCTION BASED ON DEVICE INFORMATION

(75) Inventor: Haruna Sasakuma, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 197 days.

(21) Appl. No.: 13/271,475

(22) Filed: Oct. 12, 2011

(65) Prior Publication Data

US 2012/0092691 A1   Apr. 19, 2012

(30) Foreign Application Priority Data

Oct. 13, 2010   (JP) .................................. 2010-230850

(51) Int. Cl.
*G06F 3/12* (2006.01)
(52) U.S. Cl.
USPC ........... 358/1.13; 358/1.1; 358/1.15; 715/760
(58) Field of Classification Search
CPC ...... G06F 3/1288; G06F 7/30861; H04L 9/32
USPC .................. 358/1.13–1.15, 1.16; 715/760
See application file for complete search history.

(56) References Cited

U.S. PATENT DOCUMENTS

| | | | | |
|---|---|---|---|---|
| 7,239,409 B2 * | 7/2007 | Parry | ........................... | 358/1.15 |
| 7,327,478 B2 * | 2/2008 | Matsuda | ...................... | 358/1.14 |
| 7,561,286 B2 * | 7/2009 | Suto | ............................. | 358/1.14 |
| 8,621,450 B2 * | 12/2013 | Firman et al. | ................. | 717/170 |
| 2004/0207868 A1 * | 10/2004 | Lay et al. | ..................... | 358/1.15 |
| 2005/0108530 A1 * | 5/2005 | Tonegawa | ..................... | 713/170 |
| 2008/0199199 A1 * | 8/2008 | Kato et al. | ...................... | 399/81 |
| 2009/0303526 A1 * | 12/2009 | Kobayashi et al. | .......... | 358/1.15 |
| 2009/0310180 A1 | 12/2009 | Uchida et al. | | |
| 2011/0149318 A1 * | 6/2011 | Fukada et al. | ................. | 358/1.9 |

FOREIGN PATENT DOCUMENTS

JP   2006-231760 A   9/2006
JP   2009-302890 A   12/2009

* cited by examiner

*Primary Examiner* — Dennis Dicker
(74) *Attorney, Agent, or Firm* — Buchanan Ingersoll & Rooney PC

(57) ABSTRACT

An image forming apparatus connected to an information processing apparatus over a network is provided. When being accessed from the information processing apparatus, the image forming apparatus obtains user information on a user of the information processing apparatus and device information on a functional configuration of the information processing apparatus from data received through communication involved in the access, and stores the user information and the device information. When the operator using an operating panel to operate the image forming apparatus corresponds to the user, the image forming apparatus makes settings a function thereof to be provided to the operator in such a manner that the function is made similar to a function of the information processing apparatus indicated in the device information.

12 Claims, 17 Drawing Sheets

FIG. 5

```
                401   REQUEST HEADER
GET http://www.example.com/ HTTP/1.1
Accept: */*
Accept-Language: ja
Accept-Encoding: gzip, deflate
User-Agent: Mozilla/4.0 (compatible; MSIE 6.0: Windows NT 4.0)
Host: www.example.com
Connection: Keep-Alive
```

FIG. 6

T1 BROWSER MANAGEMENT TABLE

| No. | USER ID / USER NAME | BROWSER INFORMATION | | PLUG-IN INFORMATION | |
|---|---|---|---|---|---|
| | | PRODUCT NAME (TYPE) | VERSION | FLASHPLAYER | QUICKTIMEPLAYER |
| 1 | ****/User-A | Internet Explorer | 6 | 10.0.45 | 6.0.1 |
| 2 | ****/User-B | Google Chrome | 5 | 10.0.0.1 | 7.6.6 |
| 3 | ****/User-C | FireFox | 3.7a3 | 8.0.0.1 | 6.0.1 |
| 4 | ****/User-D | Internet Explorer | 7 | 9.0.0.1 | — |
| .. | .. | .. | .. | .. | .. |

FIG. 10

P1   INFORMATION COLLECTION PROGRAM (FOR OTHER THAN IE) "plugin=navigator.mimeTypes['application/x-shockwave-flash'].enabledPlugin"
(FOR IE) "axo=new ActiveXObject('ShockwaveFlash.ShockwaveFlash.x')"

```
POST /cgi-bin/htm-form HTTP/1.0
...
FlashVersiom=10.0.45
```

FIG. 13

```
                70    PRINT JOB
        ┌─────────────────────────────────────────────────────────┐
        │ -%-12345X@PJL JOB                                       │
        │ @PJL COMMENT                                            │
     ┌  │ @PJL SET USERNAME = "userA"                             │
  D1 ┤  │ @PJL SET USERPASS = "xxxxxxxxx"                         │
     └  │ @PJL SET PCNAME = "PC1"                                 │
        │ @PJL SET URL_REGISTEAVORITEURL = ON                     │
     ┌  │ @PJL SET USER DESKTOP OS = "WinXP"                      │
  D3 ┤  │ @PJL SET URL_DESKTOP COLOR = "Maple"                    │
     └  │ @PJL SET URL_JOBSETTING = 1 //PRINT & URL REGISTRATION  │
        │ @PJL SET URL_SELECTACTION = 1 //PRINT                   │
        │ @PJL SET SECURITYPRINT=ON                               │
        │ @PJL SET SECURITYPRINTID = "1234"                       │
        │ @PJL SET SECURITYPRINTPASS =                            │
        │ "BDE56313131BAA5FF675552345C"                           │
        │ @PJL SET KMCERTSERVTYPE = NONE                          │
        │ @PJL SET QTY = 1                                        │
        │ @PJL SET PLANESINUSE = 3                                │
        │ ) HP-PCL XL;2;1;                                        │
        │ PDL BELOW                                               │
        └─────────────────────────────────────────────────────────┘
```

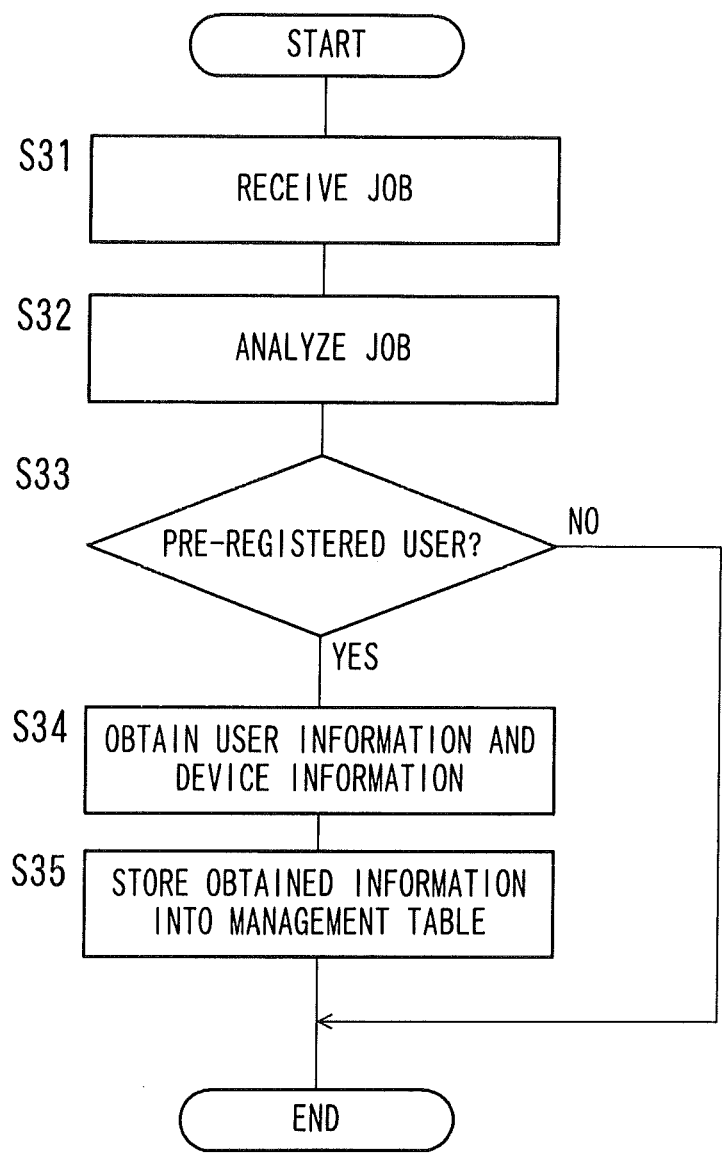

FIG. 15

T2 DESKTOP MANAGEMENT TABLE

| NO. | USER ID/ USER NAME | DESKTOP INFORMATION | |
|---|---|---|---|
| | | OS | COLOR ARRANGEMENT |
| 1 | ****/User-A | WinXP | MAPLE |
| 2 | ****/User-B | WinVista | LILAC |
| 3 | ****/User-C | Win7 | ICE GREEN |
| 4 | ****/User-D | WinXP | STANDARD |
| ⋮ | ⋮ | ⋮ | ⋮ |

601 ELECTRONIC MAIL MESSAGE HEADER

```
Return-Path: <xxxxx@testtest.com>
X-Original-To: 00000@sample.jp
Delivered-To: 11111@sample.jp
Received: from smtp16.mail.bbt.yahoo.co.jp (smtp16.mailbbt.****.co.jp
```

Da {
```
Message-ID: <2005091 3xxxxxxxxx@dbulkso2.****.co.jp>
From: sample <sample@testtest.com>
To: <00000@sample.jp>
Reply-To: zzzzz@testtest.com
Subject: test
Date: Tue, 13 Sep 2010 15:06:38 +0900
```

```
Content-Type: text/plain;
Format=flowed;
charset="iso-2022-jp";
reply-type=original
Content-Transfer-Encoding: 7bit
```
D3 { X-Miler: Microsoft Outlook Exnress 6.00.2900.2527

FIG. 17

T3 MAILER MANAGEMENT TABLE

| NO. | USER ID/ USER NAME | MAILER INFORMATION | |
|---|---|---|---|
| | | TYPE (PRODUCT NAME) | VERSION |
| 1 | ****/User-A | Outlook Express | 6 |
| 2 | ****/User-B | Outlook | 2007 |
| 3 | ****/User-C | Thunderbird | 2 |
| 4 | ****/User-D | Outlook Express | 6 |
| : | : | : | : |

D1     D3

IMAGE FORMING APPARATUS, INFORMATION DEVICE, AND COMPUTER-READABLE STORAGE MEDIUM FOR COMPUTER PROGRAM FOR SETTING A FUNCTION BASED ON DEVICE INFORMATION

This application is based on Japanese patent application No. 2010-230850 filed on Oct. 13, 2010, the contents of which are hereby incorporated by reference.

BACKGROUND OF THE INVENTION

1. Field of the Invention

The present invention relates to an information device operating in accordance with operation through an operating panel thereof and access from other devices connected to the information device over a network, an image forming apparatus serving as an information device of this kind, and a computer readable storage medium for a computer program executed in such an image forming apparatus.

2. Description of the Related Art

Information devices called Multi-Functional Peripherals (MFPs) or multifunction devices are used for business. Such an MFP has recently been equipped with functions such as copying and network printing, which are functions as an image forming apparatus, and also equipped with many other functions such as image input (scanning), facsimile transmission/reception, electronic mail message transmission/reception, document retention. Such an MFP is generally connected to a network used by users. The MFP operates in accordance with access from computers operated by the individual users, and operation performed by the individual users through an operating panel of the MFP.

The operating panel of the MFP has a display configured to display many operating screens. Such a display typically has a size of approximately 8 inches on the diagonal (resolution level of 480×200 dots). The display is configured to display sharp images to the extent that a user can use the display for browsing Web sites on the Internet. The user appropriately operates operation buttons in operating screens displayed on the operating panel, so that he/she can select his/her desired function from among many functions of the MFP, and designates operation relating to the selected function.

As to the usability of an image forming apparatus such as an MFP and a printer, a conventional art has been proposed in which a user of the image forming apparatus is identified, and an operating environment and operation of the image forming apparatus are automatically set based on the user identification in order to save the user from a burden of making the same settings on the image forming apparatus every use thereof. A printer described in JP-A-2006-231760 stores, for each user, setting values of items such as a color of an operating screen, accessibility, and language. With the printer, an operating environment is automatically changed to another environment depending on a user identified in the printer. According to the description of JP-A-2006-231760, a computer connected to the printer over a network gives a command to make settings to the printer. An MFP described in US 2009/0310180 A1 stores, thereinto, addresses of computers used on the network corresponding to users, accesses a computer corresponding to a user identified by the MFP to obtain setting information on the computer, and makes settings on the MFP based on the obtained setting information. The document US 2009/0310180 A1 describes obtaining information on computer desktop to make settings on the background color and the character color of an operating screen of the MFP, and obtaining setting information on a Web browser installed on the computer so as to make settings on a Web browser of the MFP.

Assume that an MFP is directly operated by a user of an information processing apparatus, connected to the MFP, such as a personal computer or a mobile information terminal. In such a case, the user can easily use the MFP if the MFP and the information processing apparatus have a lot in common in terms of system environment for operation. For example, when the user browses Web pages by using an operating panel of the MFP, it is preferable that the user can use, in the MFP, software of which the name is the same as a Web browser of the information processing apparatus familiar with him/her. If usability of the software depends on the version, it is more preferable that the product name and version of the software is the same between the MFP and the information processing apparatus. According to the MFP described in US 2009/0310180, settings on the MFP are made based on setting information of a computer, and consequently, a part of an operating environment of the MFP is made common to that of the computer. However, at a time when a user operates the MFP directly, a computer corresponding to the user has to be connected to a network and to be accessible. Otherwise, it is impossible to provide a common operating environment to the MFP and the computer.

SUMMARY

The present disclosure is directed to solve the problems pointed out above, and therefore, an object of an embodiment of the present invention is to enhance the usability of an information device having an operating panel for a user of an external device by making a system environment for operation of the information device similar to a system environment of the external device.

An image forming apparatus according to an aspect of the present invention is an image forming apparatus having an operating panel and connected to an information processing apparatus over a network. The image forming apparatus includes an obtaining portion configured to obtain, when the image forming apparatus is accessed from the information processing apparatus, user information on a user of the information processing apparatus and device information on a functional configuration of the information processing apparatus from data received through communication involved in the access, a storage portion configured to store the user information and the device information in such a manner that the user information and the device information are associated with each other, an identifying portion configured to identify an operator who uses the operating panel to operate the image forming apparatus, a decision portion configured to determine whether or not the operator corresponds to the user by referring to the user information, and a setting portion configured to set, when the decision portion determines that the operator corresponds to the user, a function of the image forming apparatus to be provided to the operator in such a manner that the function is made similar to a function of the information processing apparatus indicated in the device information.

These and other characteristics and objects of the present invention will become more apparent by the following descriptions of preferred embodiments with reference to drawings.

BRIEF DESCRIPTION OF THE DRAWINGS

FIG. 5 is a diagram showing an example of the details of a request header in HTTP communication.

FIG. 6 is a diagram showing an example of a browser management table.

FIG. 10 is a diagram showing an example of an information gathering program sent by a Web application of an MFP.

FIG. 12 is a diagram showing an example of a response containing plug-in information.

FIG. 13 is a diagram showing an example of details of a print job given to an MFP.

FIG. 14 is a flowchart depicting an example of the flow of operation of an MFP upon the receipt of a print job.

FIG. 15 is a diagram showing an example of a desktop management table.

FIG. 16 is a diagram showing an example of a header of an electronic mail message.

FIG. 17 is a diagram showing an example of a mailer management table.

DESCRIPTION OF THE PREFERRED EMBODIMENTS

The description is provided below, in which an MFP is taken as an example of an information device having an operating panel. The MFP is connected to a network and is shared by users.

Figure 1:
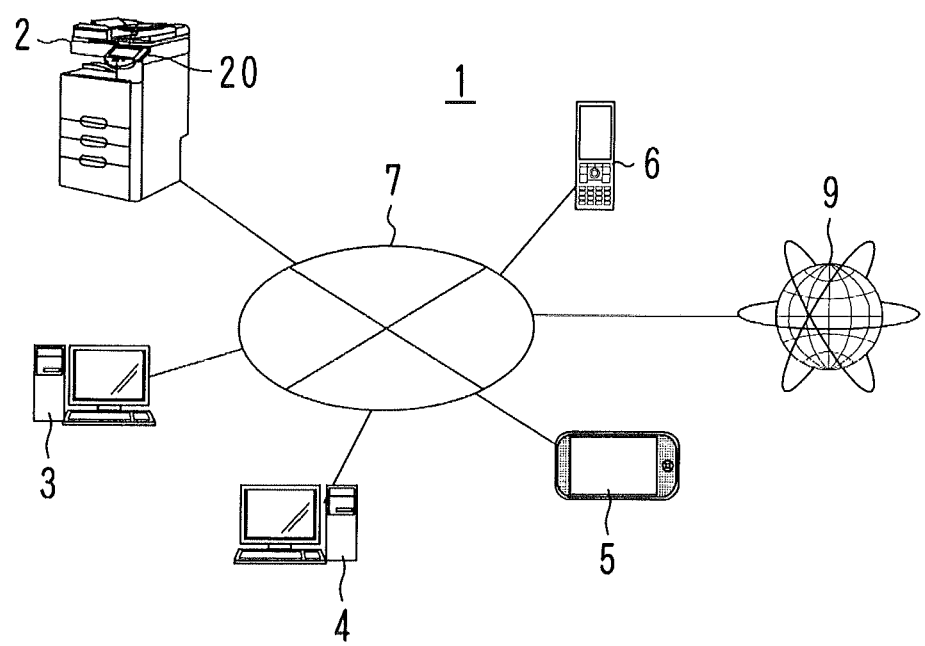
FIG. 1 is a diagram showing an example of the configuration of an information processing system according to an embodiment of the present invention.

Referring to FIG. 1, an information processing system 1 according to an embodiment of the present invention is configured of a personal computer (hereinafter, referred to as a PC) 3 serving as an information device, an MFP 2 serving as an image forming apparatus, and so on. The information processing system 1 is installed in offices of business where a Local Area Network (LAN) 7 connected to the Internet 9 is established. The LAN 7 is connected, via a wired or wireless communication path, to the PC 3, the MFP 2, and information devices such as a PC 4, a smartphone 5, a mobile phone 6, and a variety of servers (not shown).

Each of the PC 3 and the PC 4 has a hardware configuration similar to that of an ordinary personal computer. Each of the PC 3 and the PC 4 is configured of a CPU for executing a variety of programs, a ROM for memorizing a control program, a RAM used as a work area for program execution, a hard disk drive functioning as a storage, a removable media drive for accessing a CD-ROM or a DVD, a communication interface for network connection, and so on (none of which is shown in the drawings). Each of the PC 3 and the PC 4 is also provided with a display, a keyboard, and a mouse functioning as human interface devices.

The storage of each of the PC 3 and the PC 4 has a variety of applications installed by a user of the subject PC. One of the applications is a device driver associated with the MFP 2. When a user operates the PC 3 or the PC 4 to give a command to perform printing, the device driver thereof performs operation to send a print job to the MFP 2 where the print job is to be executed. Another one of the applications is electronic mail software (hereinafter, referred to as a mailer). The mailer enables the PC 3 or the PC 4 to obtain from the MFP 2, as an attachment to an electronic mail message, data stored in the MFP 2 and data captured by scanning with the MFP 2. Yet another one of the applications is a Web browser. When a user operates the PC 3 or the PC 4 to designate an IP address of the MFP 2, and gives a command to obtain data, the MFP 2 obtains data on a Web page and transfers the data on the Web page to the PC 3 or the PC 4.

Examples of the Web browser are Internet Explorer® by Microsoft Corporation, Mozilla Fire Fox® by Mozilla Foundation, GoogleChrome® by Google Inc., Safari® by Apple Inc., Opera® included in an Internet suite by Opera Software ASA. As seen above, the Web browsers have different names, and further, each of the Web browsers come in different versions. The individual Web browsers have their own unique features, e.g., high-speed display, high degree of usability, and function extension enabled. The individual users of the PC 3, the PC 4, and the information devices can install Web browsers thereonto according to their preferences, and use the installed Web browsers.

Figure 2:
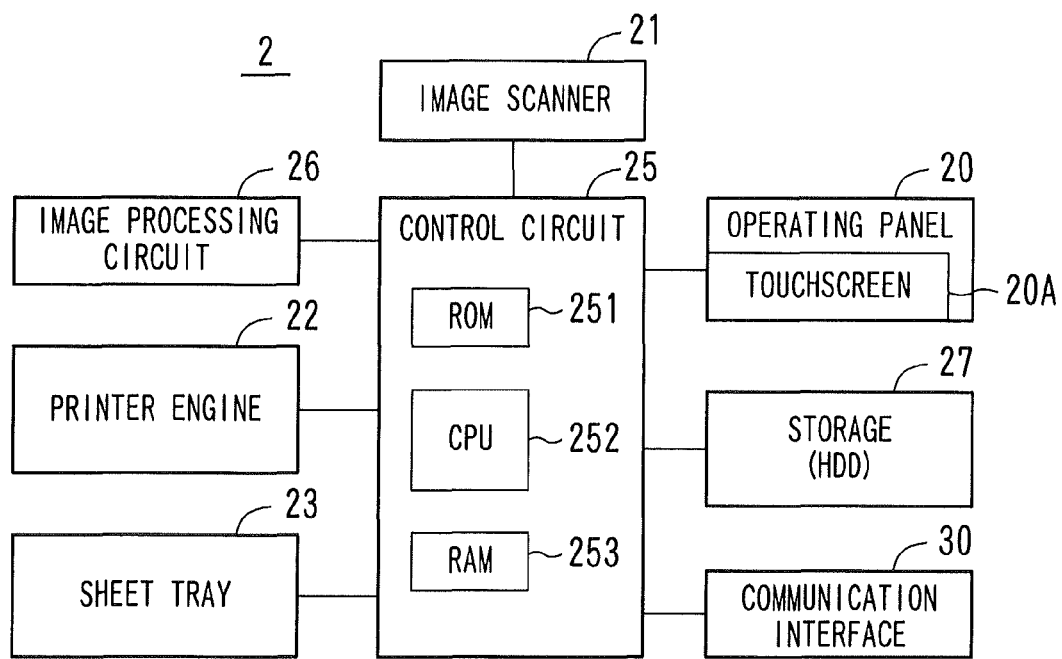
FIG. 2 is a block diagram showing an example of the hardware configuration of an MFP.

Referring to FIG. 2, the MFP 2 includes an operating panel 20, an image scanner 21, a printer engine 22, a sheet tray (stacker) 23, a control circuit 25, an image processing circuit 26, a storage 27, and a communication interface 30 for network connection. The operating panel 20 is provided with a touchscreen 20A having a display and a touch-sensitive input device. The image scanner 21 optically scans image information depicted on a document. The printer engine 22 is operable to print a monochrome or color image on a single side or both sides of paper supplied from the multi-stage sheet tray 23. The control circuit 25 is configured of a ROM 251 for storing a control program thereon, a CPU 252 for executing the control program and an application, a RAM 253 for executing programs, and so on. The image processing circuit 26 performs a variety of image processing including processing for correcting output data of the image scanner 21 and processing for converting an original image into a bitmap format for printing. The storage 27 is a mass storage device such as a hard disk drive. The storage 27 contains a memory region in which data relating to control on the MFP 2 is stored, and a memory region in which files of a variety of types of documents are retained, i.e., a so-called box. The communication interface 30 enables the MFP 2 to perform communication with external devices connected to the LAN 7.

The MFP 2 can: send, to an external device, data based on an image captured from a document by the image scanner 21; send, in response to a request from an external device, data retained in the MFP 2 to the external device as the request source or a destination designated by the request source; and perform process such as printing, facsimile transmission, and box retention based on data sent from an external device. The MFP 2 can also obtain, through Web browsing on the operating panel 20, a Web page from a Web site on the Internet or an intranet, print the obtained Web page, send the obtained Web page to an external device, and retain the obtained Web page in a box. Further, the MFP 2 can receive an electronic mail message to print the message, transfer the received electronic mail message to an external device, and attach data retained in the MFP 2 to an electronic mail message to send the message to the destination designated with the use of the operating panel 20.

The MFP 2 has a plurality of Web browsers and a plurality of mailers installed thereonto. The Web browsers are software for Web browsing, and are different from one another in name or version. The mailers are software for transmission and reception of electronic mail messages, and are different from one another in name or version. As described later, as soon as an operator who has logged onto the MFP 2 performs predetermined operation for Web browsing, one of the Web browsers that is associated with the operator in advance is launched. Likewise, in response to predetermined mailer-related operation by an operator, one of the mailers that is associated with the operator in advance is launched.

Figure 3:
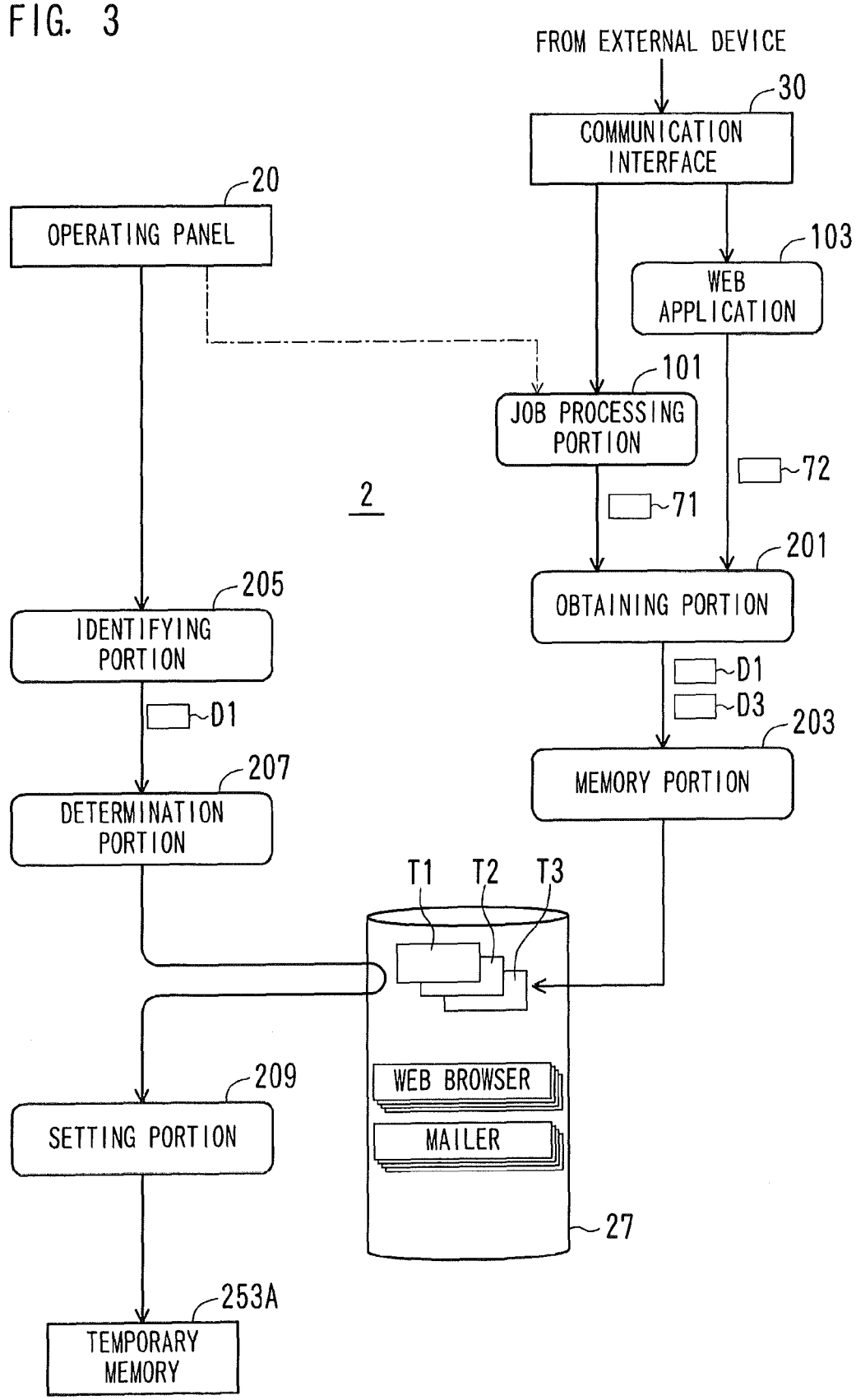
FIG. 3 is a diagram showing an example of the configuration of the principal part for automatic function settings in an MFP.

FIG. 3 is a diagram showing an example of the configuration of the principal part for automatic function settings in the MFP 2. The MFP 2 is configured of a job processing portion 101 for causing the MFP 2 to perform a process in accordance with a request from a user, a Web application 103, and so on. The job processing portion 101 executes a job sent from a predetermined device driver installed on an external device. The job processing portion 101 also executes a job given through operation on the operating panel 20. The Web application 103 performs a variety of processes in response to access from a Web browser installed on an external device. When an external device accesses the MFP 2, the Web application 103 first performs authentication of a user of the external device. The Web application 103, then, causes the MFP 2 to perform operation in accordance with a command given by the user, who is authorized by the Web application 103, using the Web browser. For example, the Web application 103 functions as a Web server enabling an external device to control the MFP 2 remotely. The Web server provides the external device with data used for selectively displaying the state of the MFP 2, job information, destination information, and document information in boxes.

Referring to FIG. 3, the MFP 2 is also provided with an obtaining portion 201, a memory portion 203, an identifying portion 205, a determination portion 207, a setting portion 209, and so on, aside from the job processing portion 101 and the Web application 103 already described above. The CPU 252 executes predetermined computer programs, and thereby, functions of the individual portions are implemented.

When an external device accesses the MFP 2, the obtaining portion 201 of the MFP 2 obtains user information D1 indicating a user of the external device and device information D3 relating to the functional configuration of the external device, from received data 71 or received data 72 for communication involved with the access. To be specific, if a device driver that is provided in the PC 3, which is an external device, and is compatible with the MFP 2 accesses the job processing portion 101, then the obtaining portion 201 obtains the user information D1 and the device information D3 from job data sent from the device driver. Alternatively, when an external device accesses the Web application 103, the obtaining portion 201 obtains the user information D1 from log-on data received by the Web application 103, and obtains the device information D3 that is information relating to a Web browser used in the PC 3 from the header of a communication packet.

The memory portion 203 stores the user information D1 and the device information D3 obtained by the obtaining portion 201 in such a manner that the user information D1 and the device information D3 are associated with each other. Such information is memorized, or, in other words, is retained by storing data indicating the information into the storage 27.

The memory portion 203 creates, in the storage 27, tables for managing the device information D3, e.g., a browser management table T1, a desktop management table T2, and a mailer management table T3. Every time new information is obtained, the details of the corresponding table are updated. These tables are detailed later.

The device information D3 is retained as discussed above by cooperative processing of the obtaining portion 201 and the memory portion 203. The device information D3 thus retained is used in order to improve the operability of the MFP 2 for a case where a user of an external device, e.g., the PC 3, operates the MFP 2 through the operating panel 20 of the MFP 2. The identifying portion 205, the determination portion 207, and the setting portion 209 are elements involved with the use of the device information D3.

The identifying portion 205 serves to identify an operator who operates the MFP 2 through the operating panel 20 thereof. To be specific, the operator is identified based on user identification information obtained through the user authentication. The user authentication is performed by employing, for example, an ordinary method in which a comparison is made between authentication information entered by the user on a log-on screen, i.e., a user ID and password, and information registered in advance. Another example of the user authentication method is a method in which authentication information is read out from an IC card or an RF tag and the read authentication information is checked against information registered in advance. Yet another example of the user authentication method is biometric authentication. Which method is to be used for operator identification depends on hardware specifications of the MFP 2.

The determination portion 207 refers to the user information D1 memorized by the memory portion 203, and determines whether or not the operator identified by the identifying portion 205 corresponds to any one of users of external devices of which the device information D3 is memorized. If the tables in the storage 27, i.e., the browser management table T1, the desktop management table T2, and the mailer management table T3, contain user information D1 corresponding to the user information D1 conveyed by the identifying portion 205, then the determination portion 207 informs the setting portion 209 that the operator of the MFP 2 corresponds to a user of an external device.

If the determination portion 207 determines that the operator of the MFP 2 corresponds to a user of an external device of which the device information D3 is memorized, then the setting information 209 sets functions to be provided by the MFP 2 to the operator thereof in such a manner that the functions are made similar to functions of the external device indicated in the device information D3. In short, the setting portion 209 brings a system environment of the MFP 2 closer to a system environment of the external device in which the operator of the MFP 2 is set as the user. This improves the usability of the MFP 2, so that the operator can use the MFP 2 easily.

The following is a description of four specific examples in which a system environment of the MFP 2 is changed based on device information D3 of an external device.

First Example

In the first example, the device information D3 is stored in response to the Web application 103 being accessed.

Figure 4:
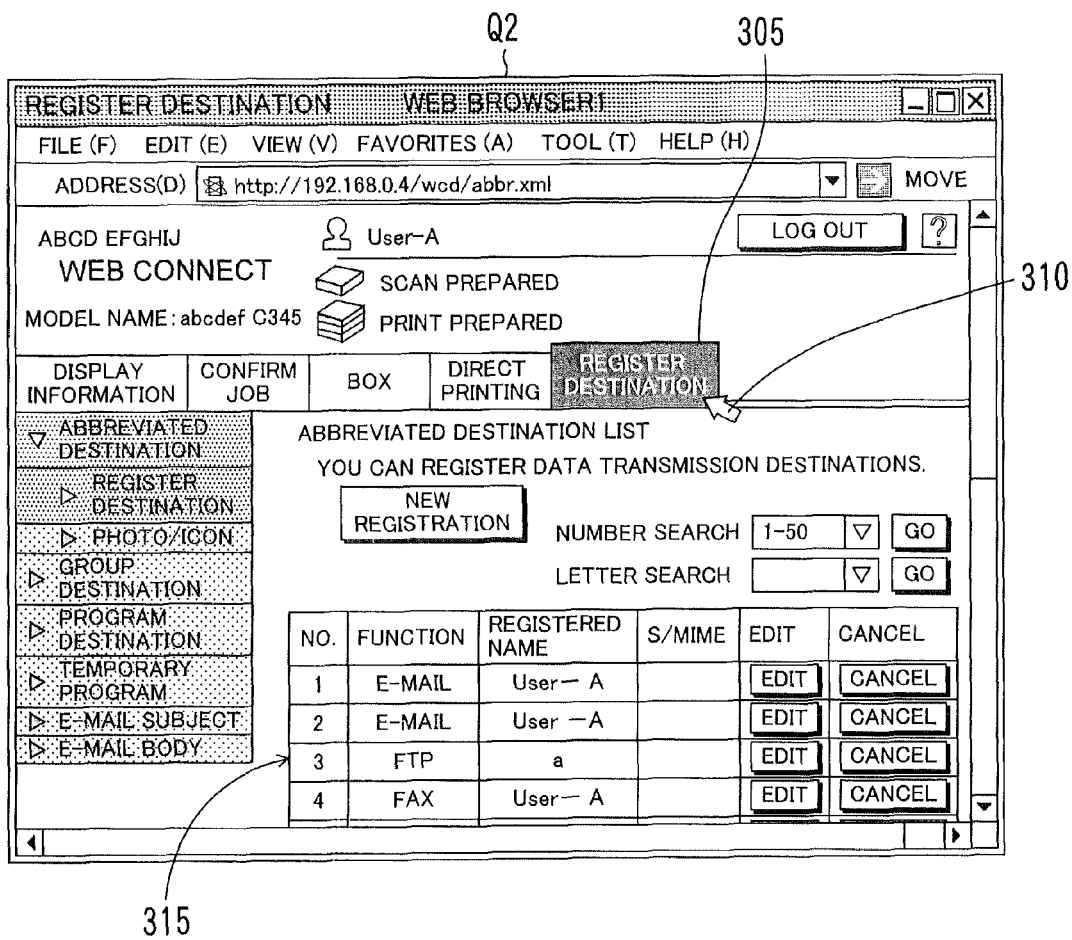
FIG. 4 is a diagram showing an example of display, related to a Web application of an MFP, of a screen made on an external device.

FIG. 4 is a diagram showing an example of display, related to the Web application 103 of the MFP 2, of a screen made on an external device. When a Web browser installed on the external device accesses the Web application 103 of the MFP 2, the illustrated operating screen Q2 is displayed on a display of the external device. The operating screen Q2 is a screen on which a user registers destinations, and which is displayed at a time when he/she performs log-on operation to enter his/her user ID and password, and then, operates a mouse to cause a mouse cursor 310 to designate a tag 305. The user successfully authenticated through the log-on operation can register destinations of electronic mail messages and facsimile transmission into the MFP 2. The successfully authenticated user can also edit or delete destinations already registered in a list 315. The storage 27 of the MFP 2 stores, therein, screen layouts based on which the operating screen Q2 is displayed, data in the list 315, help information, and so on. The Web application 103 creates image data depending on operation performed in the external device, and provides the created image data to the Web browser of the external device.

Assume that a user named "User-A" uses the PC 3 to access the Web application 103 of the MFP 2, and has logged onto the Web application 103. In Hypertext Transfer Protocol (HTTP) communication involved with this access, a request header 401 exemplified in FIG. 5 is sent from a Web browser of the PC 3 to the Web application 103. In the MFP 2, the obtaining portion 201 obtains, as the user information D1, the user ID that the user entered for the log-on. The obtaining portion 201 also obtains, as the device information D3, browser information indicated in data of item "User-Agent" of the request header 401. The contents of "User-Agent" are unique to the type of Web browser, i.e., the product name and version thereof. It is, thus, possible to determine the product name and version of a Web browser by referring to a correspondence table (not shown) prepared in advance. In the illustrated example of FIG. 5, the product name of the Web browser used in the PC 3 by the user is Internet Explorer®, and the version thereof is 6.0. In short, so-called IE6 is used as the Web browser in this example.

The browser information obtained as the device information D3 is stored in the browser management table T1 of FIG. 6 in such a manner that the browser information is associated with the user information D1, i.e., the user ID and the user name. At this time, if browser information is already registered, for the corresponding user (User-A, in this case), in the browser management table T1, then the table is overwritten and updated. Alternatively, in an information processing system where the identical user possibly uses different external devices to access the MFP 2, it is possible that device information of an external device used by the user last time is stored, or, device information of an external device frequently used by the user is stored. Yet alternatively, unless a Web browser corresponding to the obtained browser information is installed onto the MFP 2, the corresponding section in the browser management table T1 is made blank without storing the obtained browser information, or, information on a default Web browser is stored instead of the obtained browser information.

Figure 7:
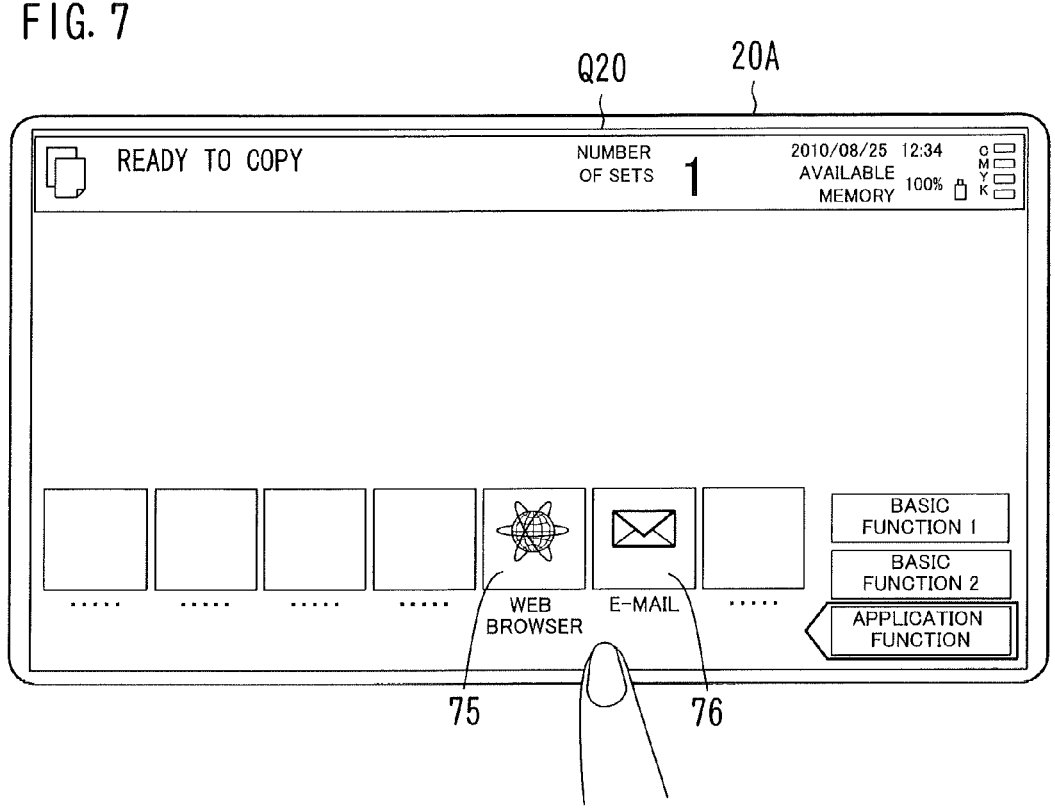
FIG. 7 is a diagram showing an example of a function selection screen displayed in a touchscreen.

After the browser information is stored as described above, the user (User-A) uses the operating panel 20 of the MFP 2 to perform log-on operation, and then touches a Web browser button 75 on a function selection screen Q20 (see FIG. 7) displayed in the touchscreen 20A. Responding to this operation, a Web browser is launched which is the same type as a Web browser associated with the user in the browser management table T1, i.e., his/her preferred Web browser, as Web browsing software for him/her. This enables the user to browse by using the MFP 2 in a manner similar to that by using the PC 3. However, if the MFP 2 does not contain any Web browsers that are the same type as that of user's preferred Web browser, then it is possible to launch a Web browser assumed to be similar to user's preferred Web browser, e.g., a Web browser having the same product name as user's preferred Web browser but having a version different therefrom. Alternatively, it is possible to launch a Web browser defined as default setting in advance.

Figure 8:
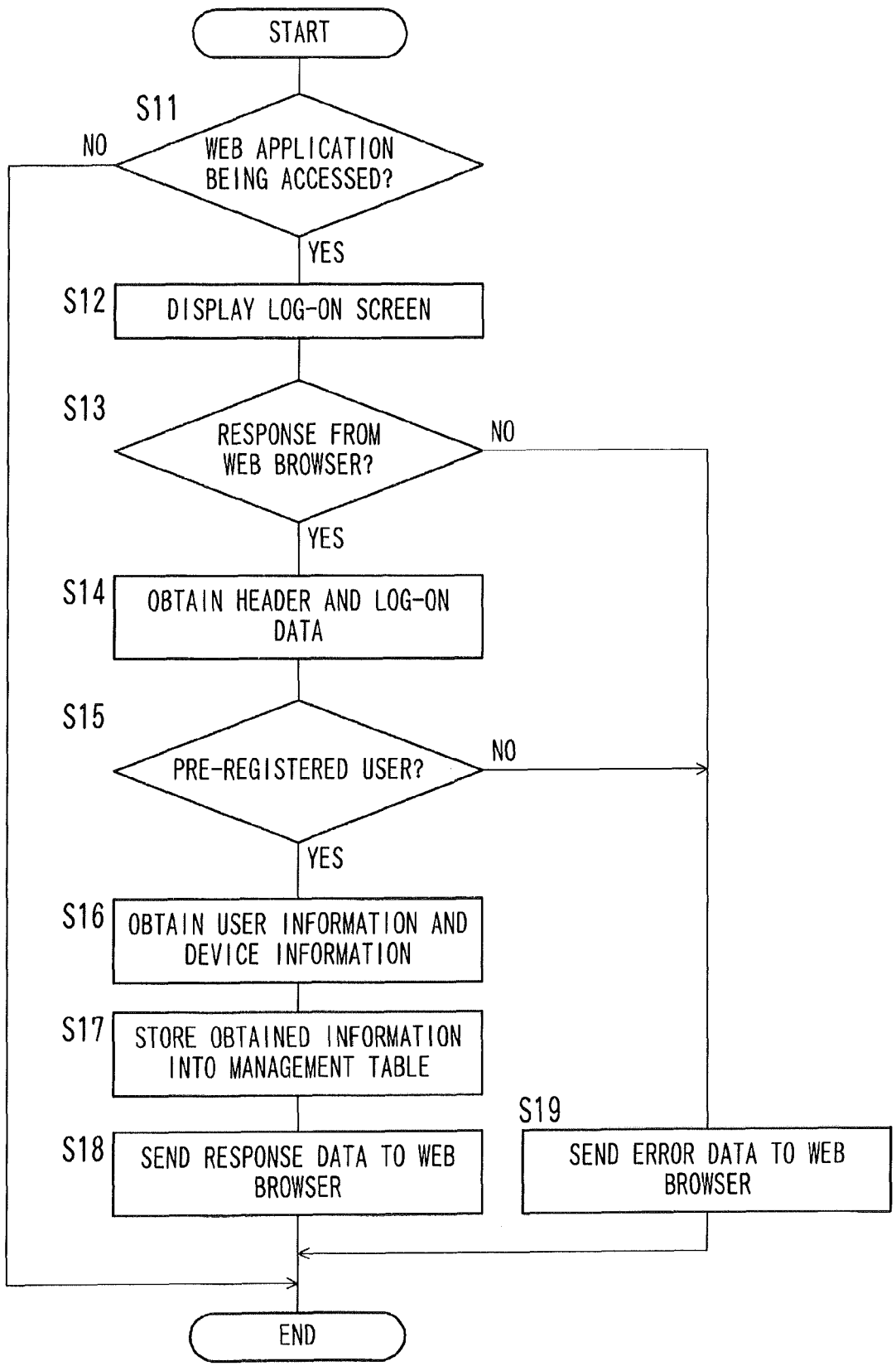
FIG. 8 is a flowchart depicting an example of the flow of operation of an MFP to respond to access from an external device.

FIG. 8 is a flowchart depicting an example of the flow of operation of the MFP 2 to respond to access from an external device. When the external device accesses the MFP 2, the Web application 103 displays a log-on screen in a Web browser of the external device as the access source (Steps S11 and S12). When data entered on the log-on screen by a user of the external device is notified, the Web application 103 identifies the user, and performs user authentication by checking the entered data against identification information registered in advance (Steps S13, S14, and S15). If the check result shows that the identified user corresponds to any of the registered identification information (Yes in Step S15), then the obtaining portion 201 obtains browser information as the user information D1 and the device information D3 (Step S16), and the memory portion 203 stores the obtained information into the browser management table T1 (Step S17). The Web application 103 informs the Web browser of the external device that the user logged onto the MFP 2 (Step S18). In contrast, if the check result shows that the identified user does not correspond to any of the registered identification information (No in Step S15), then the Web application 103 informs the Web browser of the external device that the user was not allowed to log onto the MFP 2 (Step S19).

Figure 9:
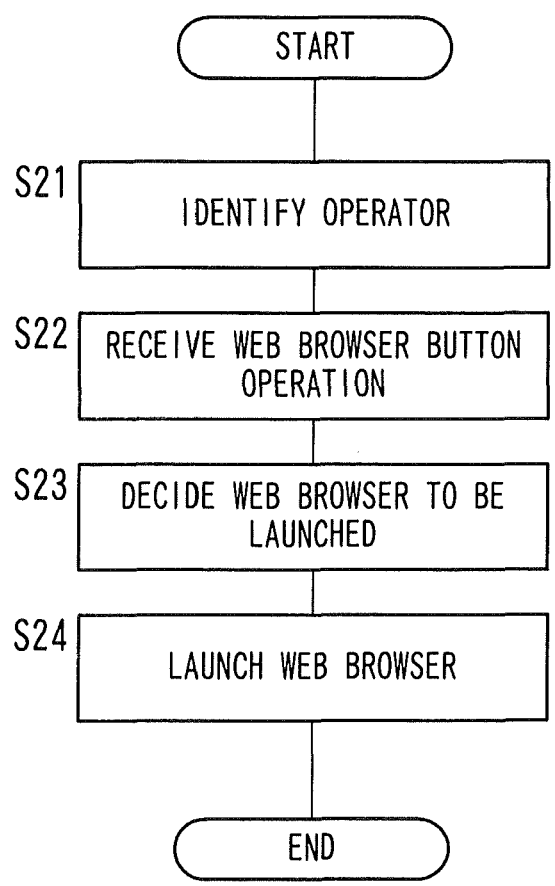
FIG. 9 is a flowchart depicting an example of the flow of operation to respond to operation made on an operating panel of an MFP.

FIG. 9 is a flowchart depicting an example of the flow of operation to respond to operation made on the operating panel 20 of the MFP 2. The identifying portion 205 of the MFP 2 identifies an operator based on the data entered by the operator through the log-on operation (Step S21). When the Web browser button 75 is operated, the setting portion 209 determines a Web browser to be launched (Steps S22 and S23), and the MFP 2 launches the Web browser immediately (Step S24).

Second Example

In the second example, in response to the Web application 103 being accessed, predetermined device information D3 is stored after gaining user's approval.

As with the first example discussed above, assume that a user named "User-A" uses the PC 3 to access the Web application 103 of the MFP 2, and has logged onto the Web application 103. In response to the access from a Web browser of the PC 3, the Web application 103 sends an information collection program P1 (see FIG. 10) described in JavaScript® to the PC 3, and requests the PC 3 to send information on the Web browser.

Figure 11:
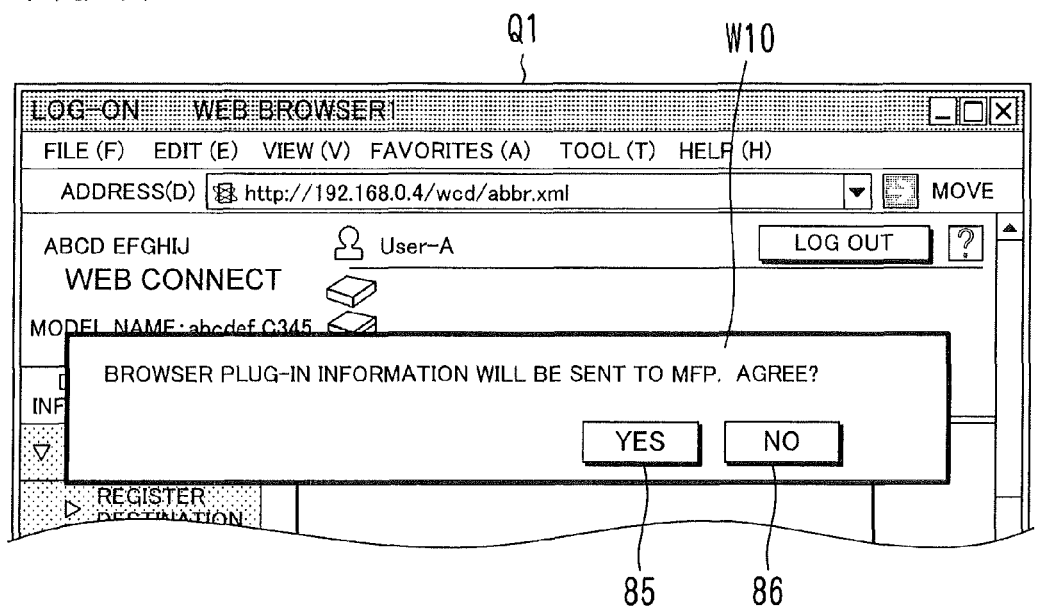
FIG. 11 is a diagram showing an example of an operating window displayed in an external device.

The PC 3 in which the information collection program P1 sent from the Web application 103 is to be executed pops up an operating window W10 over the log-on screen Q1 as shown in FIG. 11, and asks the user whether or not he/she agrees to send the plug-in information. If the user presses a "Yes" button 85, then the Web browser of the PC 3 sends, to the Web application 103 of the MFP 2, a response 405 containing the plug-in information exemplified in FIG. 12. In contrast, if the user presses a "No" button 86, then the Web browser of the PC 3 does not send the response 405.

The response 405 contains plug-in information. In the illustrated example of FIG. 12, Flash Player®, version 10.0.45 is indicated as a moving-image reproduction plug-in. The browser information obtained in a manner similar to that in the above example, and the plug-information are stored as the device information D3 into the browser management table T1 in such a manner that the browser information and the plug-information are associated with the user information D1 (see FIG. 6).

After the browser information and the plug-in information are stored in this way, the user (User-A) uses the operating panel 20 of the MFP 2 to perform log-on operation, and then touches the Web browser button 75 on the function selection screen Q20 (see FIG. 7) displayed in the touchscreen 20A. Responding to this operation, a Web browser is launched which is the same type as user's preferred Web browser associated with the user in the browser management table T1, and a plug-in is also launched which corresponds to the plug-in information and is installed onto the storage 27 in advance.

Third Example

In the third example, device information D3 is stored in response to the job processing portion 101 being accessed.

Assume that a user named "User-A" operates the PC 3 to instruct the MFP 2 to perform printing. The instructions are given, for example, on a screen displayed based on a document preparation application. The instructions are conveyed from the document preparation application through the operating system (OS) to a device driver suitable for printing by the MFP 2, i.e., a so-called printer driver. Upon receiving the instructions, the device driver creates a print job containing image information to be printed and print setting information, and sends the print job to the MFP 2.

FIG. 13 is a diagram showing an example of the details of a print job 70 to be given to the MFP 2. FIG. 13 shows an order part, called a job ticket, of the print job 70. The illustrated job ticket is described in a Printer Job Language (PLJ).

As shown in FIG. 13, the print job 70 contains the user information D1 entered by the user to log onto the PC 3, and the device information D3 of the PC 3 that is desktop information gathered by the device driver. The desktop information indicates the type of the operating system and color arrangement for display based on a Graphical User Interface (GUI). The desktop information is gathered by using existing functions such as "GetVersionEx( )" to obtain information from the operating system.

FIG. 14 is a flowchart depicting an example of the flow of operation of the MFP 2 upon the receipt of a print job. When the MFP 2 receives a print job 70, the job processing portion 101 of the MFP 2 analyzes the print job 70, so that user information D1 contained in the print job 70 is extracted (Steps S31 and S32). If the user information D1 thus extracted corresponds to any of user information registered in advance (Yes in Step S33), then the obtaining portion 201 obtains the user information D1 and the device information D3 contained in the print job 70 (Step S34), and the memory portion 203 stores the user information D1 and the device information D3 into the desktop management table T2 exemplified in FIG. 15 (Step S35).

After the desktop information is stored as the device information D3, the user (User-A) uses the operating panel 20 of the MFP 2 to perform log-on operation. Responding to this operation, the color arrangement on the operating screen displayed in the touchscreen 20A is turned into the color arrangement associated with that user in the desktop management table T2 or the color arrangement similar thereto.

Fourth Example

In the fourth example, predetermined device information D3 is stored in response to receipt of an electronic mail message in which the MFP 2 is designated as the destination.

Many existing mailers available for sale or free have individual unique characteristics such as high-speed display, high degree of usability, and function extension enabled. With the information processing system 1 of FIG. 1, users of the PC 3, the PC 4, and other information processing apparatuses, all of which are external devices from the standpoint of the MFP 2, can install user's preferred mailers and use the same. The users also can use a mailer installed in this way and a Web mail that does not needed to be installed.

A plurality of mailers are installed in the storage 27 of the MFP 2, and such mailers are, for example, Outlook®, Outlook Express®, and Thunderbird®. Upon the selection of mailers to be installed, mailers having the same name but different versions are deemed as different mailers. This is because the usability of mailers is probably quite different depending on the version thereof.

Assume that one external device (the PC 3, here) in the information processing system 1 of FIG. 1 sent an electronic mail message to the MFP 2. There is a case, for example, in which a job is attached to an electronic mail message and is given to the MFP 2. As shown in FIG. 16, a header 601 of an electronic mail message contains mail address information Da of the transmission source, and also contains, as the device information D3 indicating a mail function of the PC 3, mailer information representing the type of the mailer used in the PC 3 that is the transmission source.

The obtaining portion 201 of the MFP 2 captures the header 601 of the electronic mail message. The obtaining portion 201 obtains user information D1 corresponding to the mail address information Da of the header 601 from a user registration table (not shown) prepared in advance, and also obtains mailer information that is the device information D3 from the header 601. Then, the memory portion 203 stores the obtained mailer information into the mailer management table T3 as shown in FIG. 17. Thereby, the mailer information is stored in association with the user information D1.

After the mailer information is stored, the user (User-A) uses the operating panel 20 of the MFP 2 to perform log-on operation, and then touches a mail button 76 on the function selection screen Q20 (see FIG. 7) displayed in the touchscreen 20A. Responding to this operation, as software used for electronic mail communication by the user, a mailer is launched which is the same type as user's preferred mailer associated with the user in the mailer management table T3.

According to the embodiments, a configuration is provided in which a function of an image forming apparatus, which is an information device, to be provided to an operator using an operating panel to operate the image forming apparatus is set to be similar to a function of an information processing apparatus, which is an external device. Thus, a system environment for the image forming apparatus is similar to a system environment for the information processing apparatus, which improves the usability of the image forming apparatus for a user of the information processing apparatus.

In the embodiments discussed above, the following arrangement is possible: The MFP 2 obtains and stores, as the device information D3 on a Web browser, setting information such as the screen size and the character size in screen display based on the Web browser, Web site registration information called favorites or bookmark, and security setting information, and then Web browsing is performed in the MFP 2 based on the stored device information 3. Such information can be obtained by using technologies such as Java Applet, and ActiveX control.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus having an operating panel and connected to an information processing apparatus over a network, the image forming apparatus comprising:
   an obtaining portion configured to obtain, when the image forming apparatus is accessed from the information processing apparatus, user information on a user of the information processing apparatus and device information on a functional configuration of the information processing apparatus from data received through communication involved in the access;
   a storage portion configured to store the user information and the device information in such a manner that the user information and the device information are associated with each other;
   an identifying portion configured to identify an operator who uses the operating panel to operate the image forming apparatus;
   a decision portion configured to determine whether or not the operator corresponds to the user by referring to the user information; and
   a setting portion configured to set, when the decision portion determines that the operator corresponds to the user, a function of the image forming apparatus to be provided to the operator in such a manner that the function is made similar to a function of the information processing apparatus indicated in the device information by selecting, based on the device information, a piece of software to be launched from among a plurality of pieces of similar software which is included in the image forming apparatus to provide a function.

2. The image forming apparatus according to claim 1, further comprising a Web application configured to cause the image forming apparatus to operate in accordance with a command given by a verified user, wherein
   when the Web application is accessed from the information processing apparatus, the obtaining portion obtains the user information from log-on data received by the Web application, and obtains, as the device information, information on a Web browser used in the information processing apparatus from a header of a communication packet, and
   when the decision portion determines that the operator corresponds to the verified user, and further, when the image forming apparatus is provided with a Web browser whose name is identical to a name of the Web browser used in the information processing apparatus, the setting portion sets the Web browser of the image forming apparatus as the software for responding to browsing operation by the operator.

3. The image forming apparatus according to claim 2, wherein
   the information on the Web browser obtained by the obtaining portion includes at least one piece of plug-in information, setting information for screen display, Web site registration information, and security setting information, and
   the setting portion reflects the information obtained by the obtaining portion, to an extent possible, in setting of the Web browser of the image forming apparatus as the software.

4. The image forming apparatus according to claim 1, wherein, when the image forming apparatus is accessed from a device driver that is provided in the information processing apparatus and is compatible with the image forming apparatus, the obtaining portion obtains the user information and the device information from job data sent by the device driver.

5. The image forming apparatus according to claim 1, wherein
   when the image forming apparatus is accessed from the information processing apparatus via an electronic mail message, the obtaining portion obtains the user information from data on electronic mail address, and obtains, as the device information, information on an electronic mail application used in the information processing apparatus from a header of the electronic mail message, and
   when the image forming apparatus is provided with an electronic mail application whose name is identical to a name of the electronic mail application used in the information processing apparatus, the setting portion sets the electronic mail application of the image forming apparatus as the software for responding to operation for transmission and reception of an electronic mail message by the operator.

6. An information device having an operating panel and connected to an external device over a network, the information device comprising:
   an obtaining portion configured to obtain, when the information device is accessed from the external device, user information on a user of the external device and device information on a functional configuration of the external device from data received through communication involved in the access;
   a storage portion configured to store the user information and the device information in such a manner that the user information and the device information are associated with each other;
   an identifying portion configured to identify an operator who uses the operating panel to operate the information device;
   a decision portion configured to determine whether or not the operator corresponds to the user by referring to the user information; and
   a setting portion configured to set, when the decision portion determines that the operator corresponds to the user, a function of the information device to be provided to the operator in such a manner that the function is made similar to a function of the external device indicated in the device information by selecting, based on the device information, a piece of software to be launched from among a plurality of pieces of similar software which is included in the information device to provide a function.

7. A non-transitory computer-readable storage medium storing thereon a computer program used in an image forming apparatus that has an operating panel and is connected to an information processing apparatus over a network, and when executed by a computer provided in the image forming apparatus, the computer program causing the computer to implement:
   obtaining processing for obtaining, when the image forming apparatus is accessed from the information processing apparatus, user information on a user of the information processing apparatus and device information on a functional configuration of the information processing apparatus from data received through communication involved in the access;
   storing processing for storing the user information and the device information in such a manner that the user information and the device information are associated with each other;

identifying processing for identifying an operator who uses the operating panel to operate the image forming apparatus;

decision processing for determining whether or not the operator corresponds to the user by referring to the user information; and setting processing for setting, when it is determined that the operator corresponds to the user, a function of the image forming apparatus to be provided to the operator in such a manner that the function is made similar to a function of the information processing apparatus indicated in the device information by selecting, based on the device information, a piece of software to be launched from among a plurality of pieces of similar software which is included in the image forming apparatus to provide a function.

8. The non-transitory computer-readable storage medium according to claim 7, wherein the computer program causes the computer to further perform registering a Web application configured to cause the image forming apparatus to operate in accordance with a command given by a verified user, when the Web application is accessed from the information processing apparatus, the obtaining processing includes obtaining the user information from log-on data received by the Web application, and obtaining, as the device information, information on a Web browser used in the information processing apparatus from a header of a communication packet, and when it is determined that the operator corresponds to the verified user, and further, when the image forming apparatus is provided with a Web browser whose name is identical to a name of the Web browser used in the information processing apparatus, the setting processing includes setting the Web browser of the image forming apparatus as the software for responding to browsing operation by the operator.

9. The non-transitory computer-readable storage medium according to claim 8, wherein the information on the Web browser obtained in the obtaining processing includes at least one piece of plug-in information, setting information for screen display, Web site registration information, and security setting information, and the setting processing includes reflecting the information obtained in the obtaining processing, to an extent possible, in setting of the Web browser of the image forming apparatus as the software.

10. The non-transitory computer-readable storage medium according to claim 7, wherein when the image forming apparatus is accessed from a device driver that is provided in the information processing apparatus and is compatible with the image forming apparatus, the obtaining processing includes obtaining the user information and the device information from job data sent by the device driver.

11. The non-transitory computer-readable storage medium according to claim 7, wherein when the image forming apparatus is accessed from the information processing apparatus via an electronic mail message, the obtaining processing includes obtaining the user information from data on electronic mail address, and obtaining, as the device information, information on an electronic mail application used in the information processing apparatus from a header of the electronic mail message, and when the image forming apparatus is provided with an electronic mail application whose name is identical to a name of the electronic mail application used in the information processing apparatus, the setting processing includes setting the electronic mail application of the image forming apparatus as the software for responding to operation for transmission and reception of an electronic mail message by the operator.

12. A non-transitory computer-readable storage medium storing thereon a computer program used in an information device that has an operating panel and is connected to an external device over a network, and when executed by a computer provided in the information device, the computer program causing the computer to implement:

obtaining processing for obtaining, when the information device is accessed from the external device, user information on a user of the external device and device information on a functional configuration of the external device from data received through communication involved in the access;

storing processing for storing the user information and the device information in such a manner that the user information and the device information are associated with each other;

identifying processing for identifying an operator who uses the operating panel to operate the information device;

decision processing for determining whether or not the operator corresponds to the user by referring to the user information; and setting processing for setting, when it is determined that the operator corresponds to the user, a function of the information device to be provided to the operator in such a manner that the function is made similar to a function of the external device indicated in the device information by selecting, based on the device information, a piece of software to be launched from among a plurality of pieces of similar software which is included in the information device to provide a function.

* * * * *